US012249766B2

(12) United States Patent
Nguyen et al.

(10) Patent No.: US 12,249,766 B2
(45) Date of Patent: Mar. 11, 2025

(54) WIDE BANDWIDTH DUAL POLARIZED ARRAY ANTENNA USING ORTHOGONAL FEEDING TECHNIQUE

(71) Applicant: VIETTEL GROUP, Ha Noi (VN)

(72) Inventors: Tien Manh Nguyen, Ha Noi (VN); Ngoc Anh Trinh, Thanh Hoa (VN); Cong Kien Dinh, Ha Noi (VN); Manh Linh Nguyen, Ha Noi (VN)

(73) Assignee: VIETTEL GROUP, Ha Noi (VN)

(*) Notice: Subject to any disclaimer, the term of this patent is extended or adjusted under 35 U.S.C. 154(b) by 230 days.

(21) Appl. No.: 18/071,736

(22) Filed: Nov. 30, 2022

(65) Prior Publication Data

US 2023/0170625 A1 Jun. 1, 2023

(30) Foreign Application Priority Data

Nov. 30, 2021 (VN) .............................. 1-2021-07685

(51) Int. Cl.
*H01Q 21/00* (2006.01)
*H01Q 5/28* (2015.01)
*H01Q 21/26* (2006.01)

(52) U.S. Cl.
CPC ........... *H01Q 21/0075* (2013.01); *H01Q 5/28* (2015.01); *H01Q 21/26* (2013.01)

(58) Field of Classification Search
CPC ....... H01Q 5/28; H01Q 21/0075; H01Q 21/26
See application file for complete search history.

(56) References Cited

U.S. PATENT DOCUMENTS 6,300,906 B1 * 10/2001 Rawnick .................. H01Q 1/38
343/700 MS
10,840,593 B1 * 11/2020 Johnson ................... H01Q 5/25

FOREIGN PATENT DOCUMENTS

CN 111883906 A * 11/2020 ............. H01Q 1/246

OTHER PUBLICATIONS

English translation of CN111883906A (Year: 2020).*

* cited by examiner

*Primary Examiner* — Hoang V Nguyen
*Assistant Examiner* — Amal Patel
(74) *Attorney, Agent, or Firm* — patenttm.us

(57) ABSTRACT

The invention relates to a dual polarized wideband array antenna using orthogonal feeding technique to have a low profile and a cosecant squared beam. The array antenna includes three main parts: the element antennas, the orthogonal feeding structure and the feeding network. The spatially orthogonal feeding structure is a transition between the microstrip lines on element antennas and the striplines on the feeding network. The top layer of the feeding network operates as a ground plane for the array antenna. Due to the disparities between the stripline lengths, the phase parameters of element antennas are optimized to create a cosecant squared radiation pattern.

1 Claim, 4 Drawing Sheets

WIDE BANDWIDTH DUAL POLARIZED ARRAY ANTENNA USING ORTHOGONAL FEEDING TECHNIQUE

FIELD OF THE INVENTION

This invention relates to a wide bandwidth dual polarized array antenna using orthogonal feeding technique to have low profile and cosecant squared pattern. The array antenna with orthogonal feeding structures can be applied in base stations as well as in spectrum monitoring wideband receivers for both commerce and military purposes.

DESCRIPTION OF RELATED ART

Most of civil and military communication systems require high gain and wide bandwidth antennas. In order to be applied in point to point or satellite communication systems, in base stations and in radar systems, wideband antennas are usually arranged in an array to easily shape the radiation beam and achieve a high gain. The array antennas demand a simple feeding technique to reduce losses, increase gain and realize a compact configuration.

One of solutions to satisfy the above requirements is to employ microstrip patch antennas in the array configuration. The advantages of microstrip antennas are compact profile, small sizes and low weight. This kind of antenna is convenient to realize a high gain array antenna with linear or circular polarization by serial or parallel coplanar feeding techniques. In this approach, the transmission line of feeding networks and the radiating element of array antennas are laid on the top plane of a large dielectric substrate. But the main disadvantage of microstrip antennas as applied in communication systems is small impedance bandwidth.

Dual polarized antenna with flower-shaped radiating elements and integrated high-performance balun is a promising solution in array configurations due to its wide bandwidth, high gain and small sizes. The radiation pattern of a dual polarized wide band array antenna can be controlled or shaped in a desired fashion if the phase differences between antenna elements are appropriately assigned. The dual polarized array antenna employs a metal ground placed under the flower-shaped radiators the height of a quarter wavelength at the center frequency of the operating bandwidth. If the elements in an array are fed from a power divider/combiner by a traditional method, many coaxial cable segments and connectors are consumed, causing a complicated structure in practice.

SUMMARY OF THE INVENTION

The main purpose of this invention is to introduce the orthogonal feeding technique for dual polarized wide bandwidth array antenna with compact profile and cosecant squared pattern. The orthogonal feeding structure connects the feeding networks implemented on stripline to the antenna element's balun implemented on microstrip line, in which the stripline and microstrip line are spatially orthogonal to each other. All array antenna parts are made of printed circuit boards, facilitating mass production with high speed and precision.

In order to clarify the above targets, this invention presents the array antenna structure in details including: feeding network, orthogonal feeding part and radiating element. The feeding network is comprised of two outputs corresponding to the dual polarizations of the array antenna and multiple inputs connected to antenna elements by orthogonal feeding structures. Based on the disparities between the branches of the feeding networks, the signals fed to antenna elements in the array has the same amplitude but different phases, generating a cosecant squared pattern for the array antenna.

DETAILED DESCRIPTION OF THE INVENTION

Figure 1A:
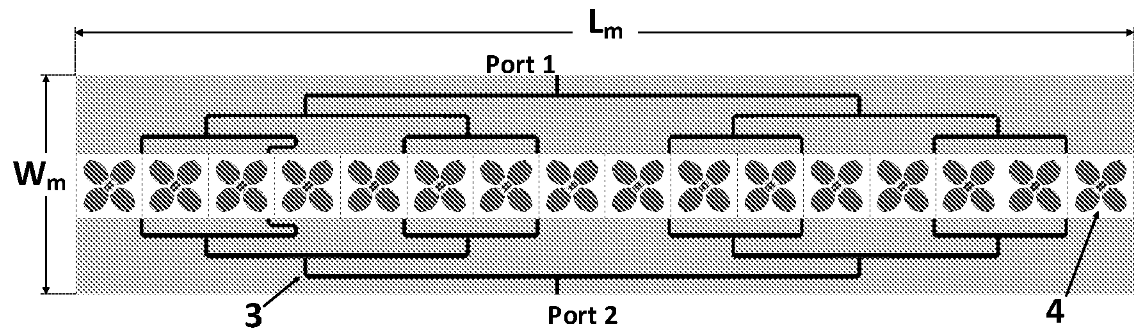
FIG. 1A is the top view of the array antenna presented in this invention.
Figure 1B:
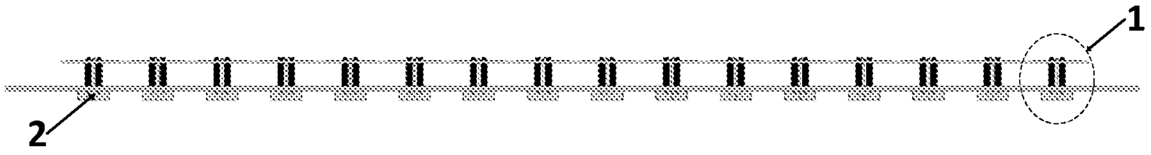
FIG. 1B is the side view of the array antenna presented in this invention.

In this invention, the orthogonal feeding technique is applied in an array antenna to reduce the number of connectors, i.e. reducing the losses at connectors and at coaxial cables. The array antenna with the proposed feeding technique is shown as in FIG. 1, comprised of the following main parts: the antenna elements 1, the orthogonal feeding structures 2 and the stripline feeding network 3.

Figure 2:
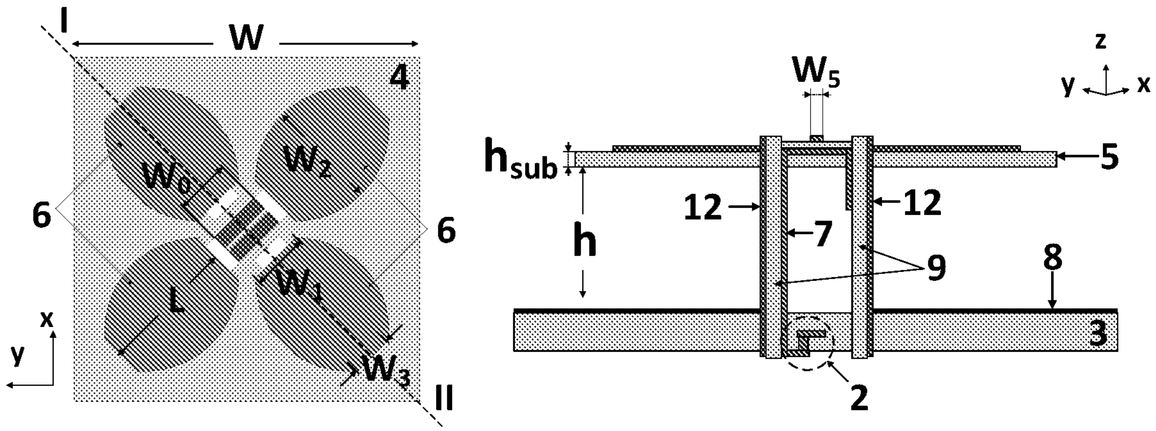
FIG. 2 is the element in the array antenna.

The antenna element 1 for array configuration, presented in FIG. 2, has the radiator 4 made of a dielectric substrate 5 and four identical thin petal-shaped conductors 6. This flower-shaped radiator has a symmetry center and two symmetry axes perpendicular to each other. The two conducting petals that are center symmetry form a dipole antenna. The four thin petal-shaped conductors 6 have the curved boundaries to generate multiple half-wavelength resonant segments, widening the operating bandwidth. The dielectric substrate 5 is made of a low permittivity material to reduce losses. The radiator 4 supported by two cross high performance baluns 7 is placed above the ground plane 8 by the height of a quarter wavelength at the center frequency of the antenna operating bandwidth.

Figure 3:
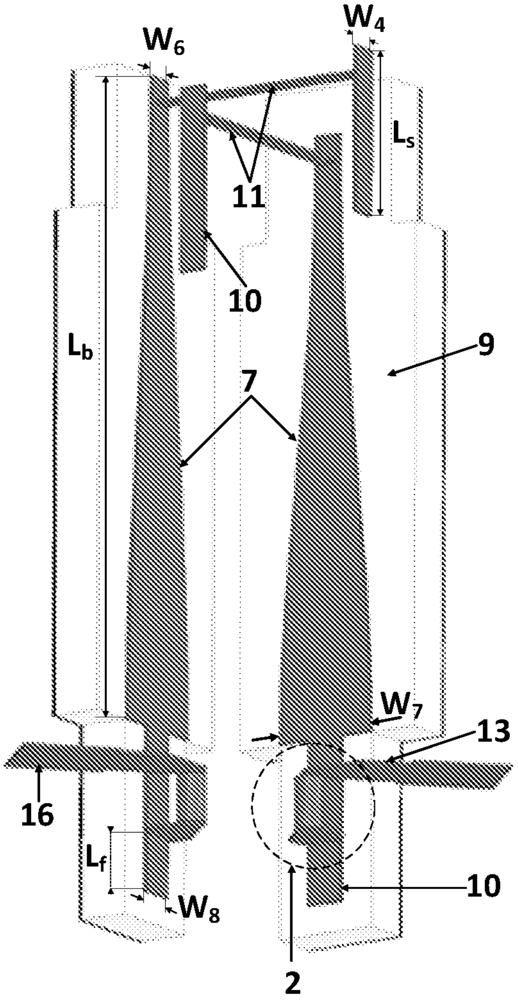
FIG. 3 is the orthogonal feeding structure and the high-performance balun in each antenna element.

Referred to FIG. 3, the two baluns 7 are partially constituted by four dielectric stem boards 9 which are symmetrical in pairs and integrated signal traces on their inner sides. All stem boards 9 perpendicularly penetrate the feeding network 3 at the positions of certain holes. The combination of the signal traces 10 on the inner sides of each stem board pair 9 and the cross-strip 11 edged on the dielectric substrate of the radiator creates a high-performance balun 7. Each pair of petals 6 soldered to respective ground conductors 12 on the outer sides of the stem boards 9 generates a resonant structure in type of a microstrip line with terminal shorting. The signal traces 10 on the inner sides of the stem boards 9 combines with the cross-strip in the middle of the radiator 4 to become a gamma-shaped (Γ) resonant structure. The two gamma-shaped (Γ) resonant structures are transformers to convert the balance signals on each pair of thin petal-shaped conductors 6 into unbalance signals at the outputs of antenna element 1.

Figure 4:
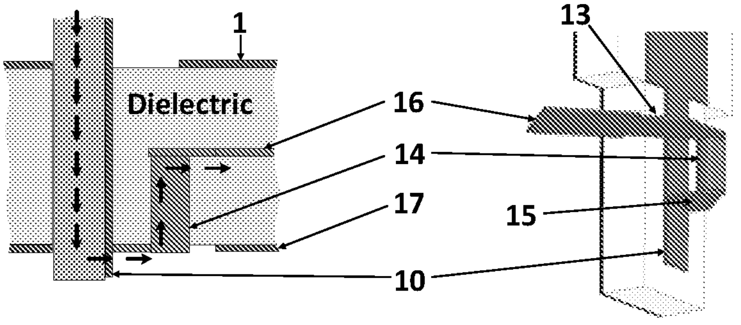
FIG. 4 is the details of the orthogonal feeding structure.

The orthogonal feeding structure 2 connecting each antenna element 1 to the stripline feeding network 3 is illustrated in FIGS. 3 and 4. This feeding structure includes a conducting segment 13 at the end of stripline, a conducting via 14 and a conducting piece 15 printed at the bottom layer of the feeding network 3. The conducting segment 13 connects the stripline end 16 of the feeding network 3 to the conducting via and the conducting piece 15. In relative space, the conducting piece 15 and the conducting segment belong to two parallel planes but different layers: the bottom layer 17 and the signal layer of the feeding network 3, respectively. The signal induced by the radiator 4 goes to the conducting segment 13 as well as the stripline 16 of the feeding network by the microstrip line of the balun 7, the conducting piece 15 and the conducting via 14. In this manner, the induced signal propagates in two spatially orthogonal directions as shown by arrows in FIG. 4.

The feeding network 3 is designed by stripline technology with three layers: the top conducting layer (considered as ground plane) 8, the signal layer (16) sandwiched between two dielectric tablets and the bottom conducting layer 17. This feeding network has two identical power dividers/combiners with a center symmetry axis. Each power divider/combiner is realized by T-shaped configurations to combine signals from antenna elements to the output. In an attempt to achieve a cosecant squared beam, the lengths of the branches in the feeding network 3 are optimized and assigned different values for antenna elements.

In practice, the radiator 4 made of Rogers RT/Duroid 5580 with the thickness of 0.508 mm, the relative permittivity ($\varepsilon_r$) of 2.2 and the loss tangent (tan δ) of 0.0009. The high-performance baluns 7 are formed by four stem boards made of Rogers RO4350B ($\varepsilon_r$=3.48; tan δ=0.0037) with the thickness of 0.508 mm. The signal traces printed on the stem boards are copper having the thickness of 0.035 mm. The stripline feeding network 3 includes two Rogers RT/Duroid 5880 tablets (0.508 mm thickness) with the signal layer in the middle. The stripline lengths connecting to different element antennas are optimized to have phase values as listed in Table 1.

TABLE 1

Phase values for element antennas in the array
Phase values
(Unit: Degree)

| | Element Number | | | | | | | |
|---|---|---|---|---|---|---|---|---|
| | 1 | 2 | 3 | 4 | 5 | 6 | 7 | 8 |
| Phase value | 360 | 349 | 338 | 327 | 316 | 305 | 294 | 283 |
| | Element Number | | | | | | | |
| | 9 | 10 | 11 | 12 | 13 | 14 | 15 | 16 |
| Phase value | 272 | 260 | 240 | 220 | 180 | 160 | 60 | −40 |

The dimensions of the array antenna are listed in the Table 2 below.

TABLE 2

The array antenna dimensions
Dimensions of the array antenna
(Unit: mm)

TABLE 2-continued

The array antenna dimensions
Dimensions of the array antenna
(Unit: mm)

| | Parameter | | | | | | | | |
|---|---|---|---|---|---|---|---|---|---|
| | $W_m$ | $W_1$ | $W_2$ | $W_3$ | $W_4$ | $W_5$ | $W_6$ | $W_7$ | $W_8$ |
| Value | 80 | 2.5 | 4.9 | 2 | 0.3 | 0.2 | 0.3 | 1.1 | 0.4 |
| | Parameter | | | | | | | | |
| | W | $W_0$ | h | $h_{sub}$ | $L_m$ | L | $L_s$ | $L_b$ | $L_f$ |
| Value | 16 | 2.5 | 5.4 | 0.508 | 260 | 0.6 | 1.7 | 6.2 | 0.63 |

Figure 5:
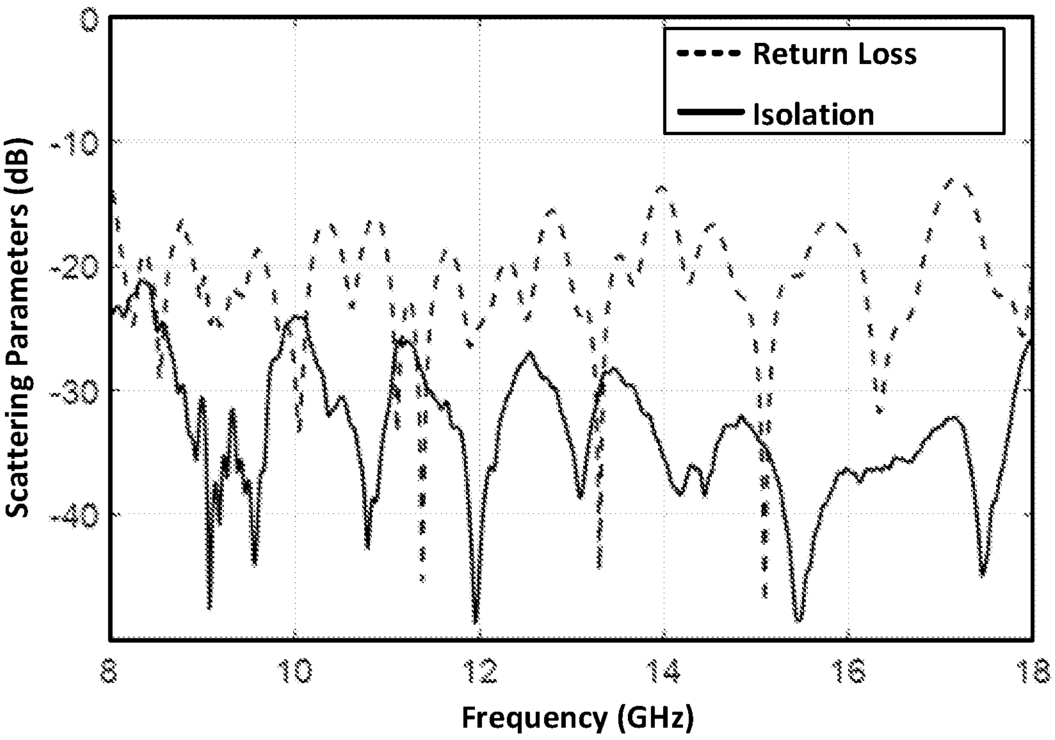
FIG. 5 is the return loss and the isolation between two outputs of the array antenna as realizing in a simulation example.

FIG. 5 performs the return loss and the isolation between two ports of the array antenna for the frequency range from 8 to 18 GHz. Return loss is the ratio of the reflected power to the incident power as testing one port of the feeding network. Referring to FIG. 5, the return loss is lower than −10 dB over the considering frequency range, indicating that the antenna accepted power is very high. On the other hand, the isolation is the ratio between the power fed into one port of the array antenna to the power received at the other port, performing the propagation level between the two polarizations of the array antenna. The isolation smaller than −20 dB over the frequency range (as shown in FIG. 5) indicates that the two array port are considerably independent and the propagating signal level is very low.

Figure 6:
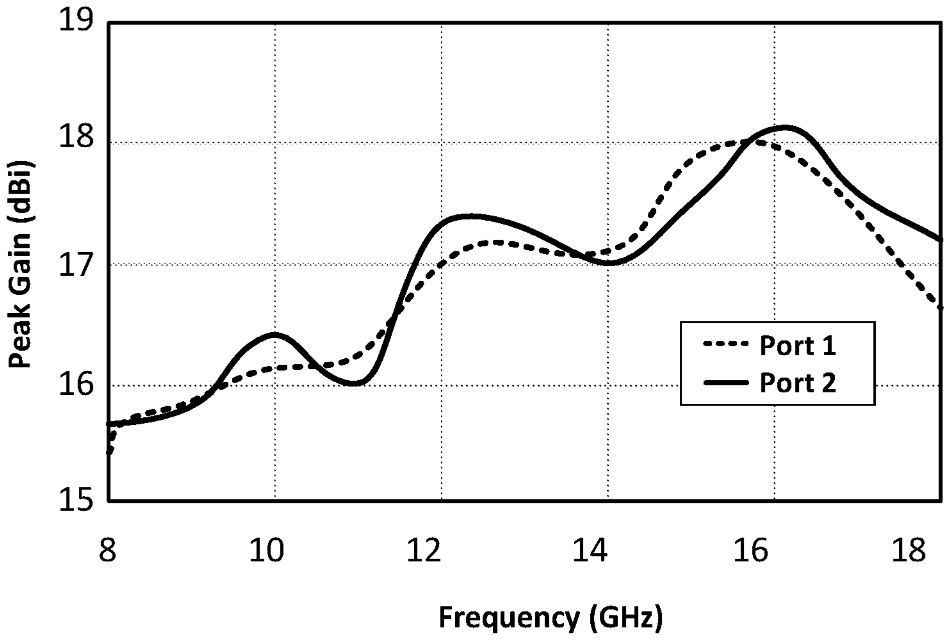
FIG. 6 is the realized array gain in a simulation.

The array antenna peak gain for the frequency range from 8 to 18 GHz is presented in FIG. 6. It is clear that the peak gains of the two antenna ports are equivalent, which smallest value is higher than 15.5 dBi.

Figure 7:
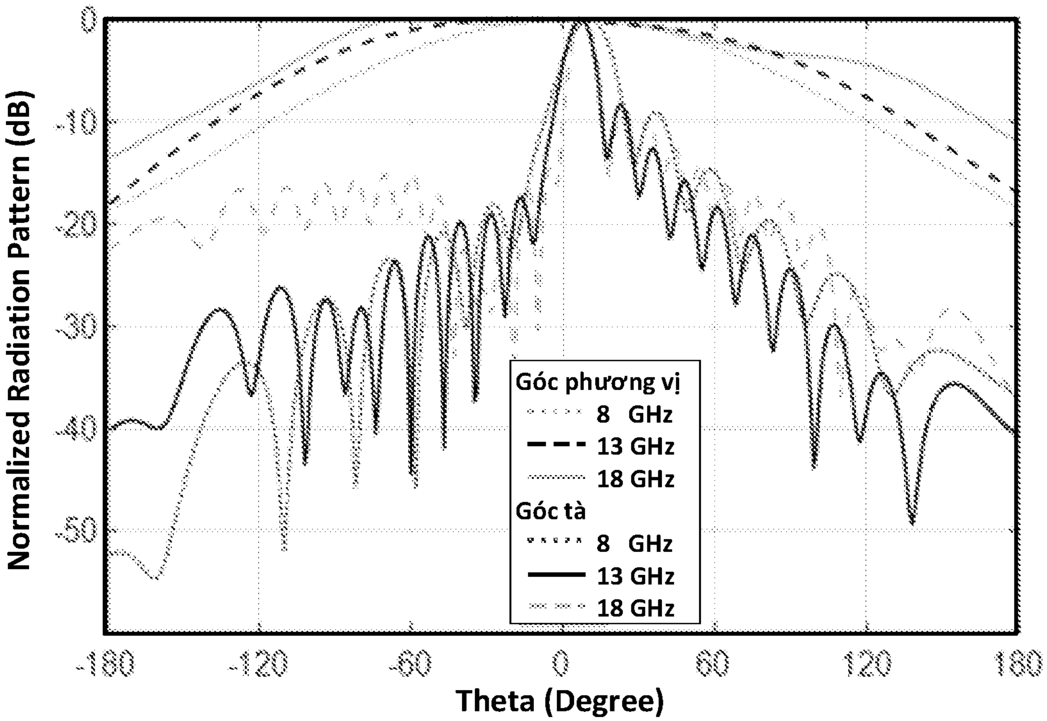
FIG. 7 is the radiation pattern of the array antenna in a simulation example.

FIG. 7 is the radiation pattern of the array antenna in azimuth and elevation planes at the frequencies of 8, 13 and 18 GHz. The radiation pattern performs how antenna radiate energy into free space in any direction. Obviously, the azimuth 10-db-beamwidths are greater than 120 degree and the radiation beam has cosecant squared shape in elevation plane at the three frequencies. The results in FIG. 7 indicate the efficacy of using the feeding network for phase shifting to have cosecant squared beam pattern.

The invention claimed is:

1. An array antenna with an orthogonal feeding structure, comprising:

sixteen antenna elements (1), each of which is configured such that: a radiator has four identical thin copper petals printed on a Rogers RT/Duroid 5880 tablet with a thickness of 0.508 mm; a high-performance balun made of four Rogers 4350B stem boards with a thickness of 0.508 mm;

the orthogonal feeding structure (2) connects a stripline of a feeding network (3) to a microstrip line of the high-performance balun integrated in each of the antenna elements;

the feeding network (3) is a printed circuit board with the stripline sandwiched between two 0.508 mm-thickness Rogers RT/Duroid 5880 tablets, the feeding network has two ground planes that are a conducting top and a bottom layers, inner striplines of the feeding network form two power dividers/combiners with a center symmetry axis, including sixteen inputs and an output.

* * * * *